United States Patent
Maurin

(10) Patent No.: US 7,406,877 B2
(45) Date of Patent: Aug. 5, 2008

(54) UNIAXIAL THERMAL AND/OR MECHANICAL DEFORMATION-MEASURING DEVICE SYSTEM AND METHOD EMPLOYING A BRAGG GRATING OPTICAL FIBRE

(75) Inventor: M. Laurent Maurin, Orsay (FR)

(73) Assignee: Commisariat A l'Energie Atomique, Paris (FR)

( * ) Notice: Subject to any disclaimer, the term of this patent is extended or adjusted under 35 U.S.C. 154(b) by 0 days.

(21) Appl. No.: 10/555,630

(22) PCT Filed: Nov. 18, 2004

(86) PCT No.: PCT/FR2004/001130

§ 371 (c)(1),
(2), (4) Date: Nov. 15, 2006

(87) PCT Pub. No.: WO2004/099713

PCT Pub. Date: Nov. 18, 2004

(65) Prior Publication Data

US 2007/0107529 A1    May 17, 2007

(30) Foreign Application Priority Data

May 7, 2003  (FR)  ................................. 03/05584

(51) Int. Cl.
*G01L 1/24* (2006.01)
(52) U.S. Cl. ........................................................ 73/800
(58) Field of Classification Search ................... 73/800
See application file for complete search history.

(56) References Cited

U.S. PATENT DOCUMENTS

| | | | |
|---|---|---|---|
| 6,276,215 B1 * | 8/2001 | Berg | 73/800 |
| 6,337,737 B1 * | 1/2002 | Chang et al. | 356/32 |
| 6,587,188 B2 * | 7/2003 | Gleine et al. | 356/32 |
| 6,923,048 B2 * | 8/2005 | Willsch et al. | 73/116 |
| 2003/0038231 A1 | 2/2003 | Bryant et al. | |
| 2004/0197050 A1 * | 10/2004 | Lovseth et al. | 385/37 |

FOREIGN PATENT DOCUMENTS

| | | |
|---|---|---|
| DE | 19724528 A | 12/1998 |
| DE | 19943387 A | 11/2001 |
| WO | WO 99/32911 A | 7/1999 |
| WO | WO 00/33046 A | 6/2000 |

* cited by examiner

*Primary Examiner*—Max Noori
(74) *Attorney, Agent, or Firm*—RatnerPrestia

(57) ABSTRACT

Uniaxial deformation-measuring device includes a section of optical fiber equipped with a Bragg grating aligned with the measurement axis, and a test body subjected to the deformations to be measured., this device includes the fixing points for attaching the fiber to the test body. The fixing points are separated by a distance ($L_{fib}$) having a variation ($\Delta L_{fib}$). When the test body is stressed by the deformation, the effective length ($L_{ce}$) of the test body has an elongation ($\Delta L_{ce}$). The length ($L_{fib}$) of the section of optical fiber and the effective length ($L_{ce}$) of the measurement body are such that the longitudinal deformation ($\Delta L_{fib}/L_{fib}$) of the section of optical fiber is strictly greater than the originating deformation ($\Delta L_{ce}/L_{ce}$) of the test body, thus defining an amplification factor K which is strictly greater than 1 and which is equal to the quotient ($\Delta L_{fib}/L_{fib}$)/($\Delta L_{ce}/L_{ce}$) in the first order.

24 Claims, 6 Drawing Sheets

UNIAXIAL THERMAL AND/OR MECHANICAL DEFORMATION-MEASURING DEVICE SYSTEM AND METHOD EMPLOYING A BRAGG GRATING OPTICAL FIBRE

The present invention pertains to a uniaxial thermal and/or mechanical deformation-measuring device, system and method employing a Bragg grating optical fiber, particularly for measuring a force and/or a temperature.

BACKGROUND

An optical fiber 110 (FIG. 1) transmits an electromagnetic radiation 112, maintained in its optical core 114 due to a difference between the refractive index $n_c$ of the optical core 114 and the refractive index $n_g$ of the optical cladding 116, with a low attenuation, on the order of 0.20 dB/km, for a transmission having a wavelength of 1.55 μm.

Furthermore, a mechanical coating 118 surrounds the optical fiber 110 so as to make possible its handling without causing the latter to become fragile. Classically, this coating 118 is made of polyacrylate or polyimide.

The refractive index $n_c$ of the optical core 114 may undergo a longitudinal modulation in the optical core locally, according to a spatial period Λ or "pitch," so that the optical fiber would reflect the radiation being propagated at a given wavelength $\lambda_B$. This local longitudinal modulation of the index constitutes a Bragg grating and the wavelength $\lambda_B$ reflected is called the characteristic Bragg wavelength of the grating.

This wavelength $\lambda_B$ may be predetermined by means of the Bragg equation which is written, in the first order:

$$\lambda_B = 2\Lambda n_e(T, \lambda, [\epsilon_{3\times3}]) \quad (1)$$

where Λ is the characteristic pitch of the Bragg grating inscribed in the optical fiber, $n_e$ is the effective index of the guided dominant mode of the optical fiber, T is the temperature of the optical fiber in the grating, λ is the wavelength of the electromagnetic radiation and $[\epsilon_{3\times3}]$ is the 3×3 tensor of the Green-Lagrange deformations of the fiber.

This $[\epsilon_{3\times3}]$ tensor of the Green-Lagrange deformations of the fiber is dependent on the local variations of the dimensions of the fiber, such as its length. These dimensions may vary depending, for example, on the hydrostatic pressure being applied to the section of optical fiber carrying the Bragg grating.

Consequently, it appears that the Bragg wavelength $\lambda_B$ of a Bragg grating is dependent upon physical, mechanical and/or thermal parameters, having an effect on this grating.

Therefore, an optical fiber equipped with at least one Bragg grating may be used to measure physical parameters, for example, when these physical parameters have an effect on the length $L_{fib}$ of the optical fiber at the level of a Bragg grating, such that a variation of this parameter leads to a change in the characteristic wavelength $\lambda_B$ of the Bragg grating.

It should be specified that the phrase "deformation of the optical fiber" includes mechanical deformations, for example, deformations generated by a mechanical action such as an elongation force exerted on the fiber, and thermal deformations generated by a variation in temperature. For example, a variation in temperature may generate a variation in the effective index of the fiber. In fact, the temperature T to which a Bragg grating is subjected changes its characteristic wavelength $\lambda_B$.

Moreover, it is known that the determination of a deformation measured by a Bragg grating is optimal when its deformation remains homogeneous, i.e., when the grating passes from a pitch Λ at rest to a pitch $\Lambda_m$ under the effect of a variation in the variable to be measured. An absence of deformation gradient along the grating guarantees such a homogeneity.

The variation of a parameter is measured by means of a light beam sent in the optical fiber from one of its ends, this beam comprising at least the wavelength $\lambda_B$ of a Bragg grating inscribed in this optical fiber, as well as the Bragg wavelengths of this grating when it is subjected to variations in the measured physical parameter.

More precisely, the characteristic wavelength $\lambda_B$ of the Bragg grating has a variation $\Delta\lambda_B$ when, for example, a variation ΔT in its temperature, $\Delta L_{fib}$ in the length of the optical fiber and/or ΔP in the hydrostatic pressure occurs in the Bragg grating reflecting this wavelength $\lambda_B$.

When the fiber is deformed uniaxially along its axis of optical propagation, such an equation can be written by differentiating equation (1) in relation to the temperature T, the length $L_{fib}$ of the optical fiber comprising the Bragg grating and the hydrostatic pressure P surrounding this optical fiber at the level of the Bragg grating. Thus, we obtain:

$$\Delta'\lambda_B/\lambda_B = a'\Delta T + b'\Delta\epsilon_{fib} + c'\Delta P \quad (2)$$

where a', b' and c' are, in a first approximation, constants peculiar to the nature of the optical fiber in question and $\Delta'\lambda_B$ is the variation in the characteristic wavelength $\lambda_B$ of the Bragg grating, $\Delta\epsilon_{fib}$ is the variation in longitudinal mechanical deformation of the fiber, equal, in the first order, to the quotient $\Delta L_{fib}/L_{fib}$ of the variation of mechanical origin $\Delta L_{fib}$ of the length $L_{fib}$ of the optical fiber.

A measuring device is generally designed so that only the variable to be measured acts on the signal $\Delta'\lambda_B/\lambda_B$ effectively measured. For this purpose, it uses a test body 123 (FIG. 1b), on which is fixed, by means of two fixing points 121 and 125, the section of fiber 110 having a length $L_{fib}$, in which is inscribed at least one Bragg grating 124.

In this case, equation (2) is written as follows:

$$\Delta\lambda_B/\lambda_B = a\Delta T + b\Delta\epsilon_{ce} + c\Delta P \quad (3)$$

where a, b and c are constants depending on a', b' and c', respectively, taking into account the geometry of the test body 123 and its thermomechanical characteristics.

Moreover, $\Delta\epsilon_{ce}$ represents the variation in mechanical deformation of the test body 123, which is equal, in the first order, to the quotient $\Delta L_{ce}/L_{ce}$ of the variation of mechanical origin $\Delta L_{ce}$ in the length $L_{ce}$ of the test body.

By disregarding the effect of the pressure (c ΔP), this equation (3) makes it possible, starting from the measurement of the variations $\Delta\lambda_B$ in the wavelength reflected by the Bragg grating 124 of the optical fiber 110, to measure a deformation due to:

a variation in the temperature to which the Bragg grating 124 is subjected, and/or a variation in the deformation $\Delta L_{ce}/L_{ce}$ between the anchoring points 121 and 125 of the section of the optical fiber 110 carrying the Bragg grating 124.

Such a measurement of variation in deformation $\Delta L_{ce}/L_{ce}$ of the test body 123 can be used to measure a variation in force ΔF being exerted on this test body 123. In fact, it is possible, knowing the thermomechanical properties and the geometry of the test body, to establish a correspondence between the value of this variation in force ΔF and a variation $\Delta L_{ce}/L_{ce}$ in the uniaxial deformation of any fiber aligned between the two anchoring points 121 and 125 of this test body.

In this example, the Bragg grating 124 optical fiber 110 is preloaded under tension between the two anchoring points 121 and 125 of the test body 123.

Thus, when an action is exerted on this test body 123, the latter is caused to deform, leading to a variation $\Delta L_{ce}$ in the distance between the two anchoring points 121 and 125, which can be measured by means of the variation $\Delta\lambda_B$ in the wavelength reflected by the Bragg grating 124 optical fiber 110.

In other words, the variations $\Delta L_{ce}$ in the length $L_{ce}$ of the test body are measured by the variations $\Delta\lambda_B$ in the Bragg wavelength $\lambda_B$ reflected by the Bragg grating 124 inscribed in the optical fiber 110.

A measuring device equipped with a Bragg grating optical fiber has many advantages. For example, it makes it possible to put the spectral analysis system in charge of the measurement of the Bragg wavelength at a distance from the measurement point due to the low spectral attenuation of the optical fiber with respect to the radiation transmitted.

Such a distance is advantageous when, for example, the measurement is carried out in an environment that is hostile (elevated temperature and humidity) or not readily accessible for the signal processing means.

Other advantages lie in the fact that the optical fiber is insensitive to external electromagnetic interferences or that it behaves linearly in deformations, that it makes it possible to obtain a good resolution, and that it is insensitive to the aging of the end components (for example, laser or connection sources), the measurement principle being based on a spectral measurement, i.e., the characteristic Bragg wavelength of the grating.

THE PROBLEM SOLVED BY THE INVENTION

However, in some cases, the measuring sensitivity of a classical Bragg grating optical fiber device is insufficient to have a sufficient measurement resolution with respect to a temperature and/or a force, and more generally, a deformation.

For example, it may be desired to measure the contact force between a pantograph and its catenary wire so as to minimize this force and reduce the wear of its components.

Such a measurement is carried out by detecting the deformations of the pantograph during its action on the catenary wire so that, knowing the thermomechanical behavior of the pantograph, the vertical loads applied, among others, by the catenary wire on this pantograph can be calculated.

In this case the sensitivity for measuring or detecting a Bragg grating optical fiber classically used as in the prior art is insufficient.

A pantograph is actually as a whole dimensioned for having a high rigidity and very limited deformations. Thus, in a first example, a variation of 1 N in the vertical force applied on the carbon block induces, by three-point deflection, a variation in longitudinal deformation on the order of $5\times10^{-5}\%$, this contact force being able to develop into a variation range ranging up to 500 N.

In other words, the absolute deformation resolution required by the measuring device to resolve a contact force variation of 1 N is on the order to $5\times10^{-5}\%$.

Such a resolution cannot be supplied by gauges of resistive electric deformations because, in fact, electromagnetic fields generated by the catenary wire interfere with the measurement signal supplied by these gauges.

According to other examples, variations in deformations to be measured of structures which are designed not to vary, such as buildings, bridges or water dams, may also be too low to be able to be measured satisfactorily with a classical device equipped with a Bragg grating optical fiber.

SUMMARY OF THE INVENTION

The present invention solves the problem mentioned above by proposing a device, a system and a method, whose measuring sensitivity is greater than those of the usual Bragg grating optical fiber devices, systems or methods.

The present invention is a result of the observation that an optical fiber has a longitudinal deformation rupture limit greater than the longitudinal elastic deformation limit of the materials generally used for forming a test body, and in particular metals, as is shown in FIG. 2.

This FIG. 2 shows, along an X axis 200, the longitudinal deformation $\epsilon$ of an optical fiber with a silica $SiO_2$ matrix (curve 202) and the deformation of metals during a standard tensile and compression test, i.e., steels (curve 204) and high-yield-point steels, also called HYP steels (curve 206), depending on the load $\sigma$ (Y axis 208) to which each material is subjected.

In that case, it is observed that the range of deformations of a silica optical fiber (curve 202) has a rupture deformation limit under tension on the order of 5%, which is markedly higher than the elastic deformation limit of metals, on the order of 0.2%.

The present invention is also a result of the observation that, as shown later on, the signal measured by the relative displacement $\Delta\lambda_B/\lambda_B$ of the characteristic wavelength of a Bragg grating varies in proportion to the relative variation $\Delta L/L$ in the distance L between the two points of anchoring to the test body of the section of the optical fiber carrying the Bragg grating used to carry out the measurements. According to usage, such a relative variation shall hereinafter be called "deformation."

In the quotient $\Delta L/L$, it is observed that only the variation $\Delta L$ in the length L of the section of the optical fiber used to carry out measurements, i.e., comprised between two attachment points of the test body, is linked with the variable to be measured.

In other words, the length L of the section of Bragg grating optical fiber stressed to carry out the measurements of deformations can be changed so that this length is less than the length of the measurement body $L_{ce}$ by a factor K. In this case, the relative displacement $\Delta\lambda_B/\lambda_B$ of the characteristic wavelength of a Bragg grating is increased by this factor K, thus facilitating the measurement of this variation.

Therefore, the present invention pertains to a uniaxial deformation-measuring device comprising a section of optical fiber equipped with at least one Bragg grating aligned with the direction of the measurement axis, and a test body subjected to the deformations to be measured and transmitting same to the section of optical fiber, means for sending in the fiber a light wave comprising the Bragg wavelengths which all the Bragg gratings inscribed in this fiber can reach, and means for reading the Bragg wavelength of each of these gratings, characterized in that:

the fixing points, capable of subjecting this fiber section to a negative, positive or zero preload and of transmitting the elongations of the test body thereto, are separated by a distance ($L_{fib}$) having a variation ($\Delta L_{fib}$) when the test body is stressed by the deformation to be measured, the effective length ($L_{ce}$) of the test body has an elongation ($\Delta L_{ce}$) when the test body is stressed by the deformation to be measured, the length ($L_{fib}$) of the section of optical fiber and the effective length ($L_{ce}$) of the measurement body are such that the longitudinal deformation ($\Delta L_{fib}/L_{fib}$) of the section of optical fiber is strictly greater than the originating deformation ($\Delta L_{ce}/L_{ce}$) of the test body, thus defining an amplification factor K that is strictly greater than 1 and is equal to the quotient ($\Delta L_{fib}/L_{fib}$)/($\Delta L_{ce}/L_{ce}$) in the first order.

For uniaxial deformations of high amplitude, i.e., beyond 5%, such as those, for example, that it is possible to obtain with a plastic fiber, the terms beyond the first order must also be taken into account, and the definition of K becomes:

$$ln[1+(\Delta L_{fib}/L_{fib})]/ln[1+(\Delta L_{ce}/L_{ce})]$$

Between the part of the test body delimited by the effective length $L_{ce}$ and subjected to the uniaxial deformation to be measured and the fixing points of the fiber spaced apart by $L_{fib}$, there is, at at least one of the ends of the section of optical fiber, a mechanical element that is not subjected to the same deformation but transmits the corresponding elongation to the fiber. This mechanical element may be an integral part of the test body or may be an element separate from this test body. It generally has a projecting shape.

Thus, the length ($L_{fib}$) of the section of optical fiber is preferably less than the length ($L_{ce}$) of the test body.

It should be noted that the amplification, by the factor K, of the measurement signal can be obtained when the variation $\Delta L_{fib}$ in the length $L_{fib}$ of the fiber used for the measurement is distinct from the variation $\Delta L_{ce}$ in the test body. However, according to the preferred embodiment of the present invention, the variation in length ($\Delta L_{fib}$) of the section of optical fiber is equal to the variation in length ($\Delta L_{ce}$) of the test body.

In fact, the present invention makes it possible to increase the resolution of measurements carried out while the mechanical deformation of the test body $\Delta L_{ce}/L_{ce}$ is less than the mechanical deformation $\Delta L_{fib}/L_{fib}$ of the section of the Bragg grating optical fiber used to carry out deformation measurements.

As an example, for a factor K equal to three ($\Delta L_{ce}/L_{ce}=3$ ($\Delta L_{fib}/L_{fib}$)), the dynamic range of the measured signal $\Delta \lambda_B/\lambda_B$, i.e., the range of measured values, becomes three times more extensive, which leads to the sensitivity of the device being multiplied by this factor K.

The value K is strictly greater than 1 and its higher value is only limited by subsidiary loads, for example, linked with the stressed materials.

This factor K is also limited by the fact that the length $L_{fib}$ must in no case be less than the length of the Bragg grating, or if there are a plurality of Bragg gratings measuring the deformation of the test body, the shortest distance measured along the optical fiber which comprises all these Bragg gratings.

Finally, this factor K is also limited by the fact that the rupture limit of the optical fiber must not be reached.

The deformation-measuring device according to the present invention also makes it possible to carry out measurements of forces or mechanical loads. It is sufficient for this to associate with it means capable of converting these forces or mechanical loads into a uniaxial deformation measured by the device according to the present invention. In this case, the subsidiary loads limiting the upper value of K may result from the limitation of errors induced by the thermal expansion of the mechanical pieces, whose dimensions and thermomechanical properties determine K.

It has been specified that between the part of the test body delimited by the effective length $L_{ce}$ and the fixing points of the fiber spaced apart by $L_{fib}$, there would be at least one mechanical element which is not subjected to the same deformation as the test body but which transmits the corresponding elongation to the fiber. In the case of measurements of forces or mechanical loads, each of these mechanical elements is not, by design, subjected to any of the deformations generated by the forces or mechanical loads to be measured.

The deformation-measuring device according to the present invention also makes it possible to carry out temperature measurements. It is sufficient for this to associate with it means capable of converting these temperatures into a uniaxial deformation measured by the device according to the present invention.

In this case, each mechanical element, which is not subjected to the same deformation as the test body, but which transmits the corresponding elongation to the fiber, is not subjected to the same deformations as the test body over its effective length ($L_{ce}$) because it is separate from the test body, made of a material not necessarily having the same coefficient of expansion, and that, consequently, it is not necessarily subjected to the same thermal expansion.

The deformation-measuring device according to the present invention also makes it possible to carry out torque measurements. It is sufficient for this to associate with it means capable of converting these torques into a difference in deformation of two Bragg gratings, each measuring a uniaxial deformation, and adequately equipped so that this difference is linked with the torque to be measured. This example shall be described in detail later on during the description of exemplary embodiments of the present invention. The loads of this type of embodiment are the same as those linked with the measurement of forces and mechanical loads, to which are added the known loads of differential measurements, such as, for example, the importance of associating two elements which are as similar to one another as possible.

It is important to emphasize that the principle of the present invention, which aims to amplify the deformations experienced by a test body in the Bragg grating of an optical fiber, is contrary to the usual usage, according to which one tends to limit the stresses of the deformable material forming the test body in order to preserve its metrological properties and its service life.

Associating with each test body a plurality of parallel sections of one or more optical fibers, each carrying at least one Bragg grating and in accordance with the present invention above would not be going beyond the framework of the present invention.

The fixing of the fibers at the ends can, for example, be done by soldering, bonding, winding around a capstan. However, the present invention stresses the optical fiber more strongly than in the prior-art measuring devices. Thus, the present invention may generate very high deformation gradients at the fixed ends of the stressed fiber portion, which may lead to damages or even rupture of the fiber.

To avoid this, the preferred embodiment of the present invention resorts, at each end of the fiber, to a device for fixing this fiber which is separate from the test body and constitutes a type of chuck specific to the optical fiber in question.

These types of chuck comprise at least three clamping jaws distributed around a principal axis merged with the axis of the fiber, each clamping jaw comprising an internal surface consisting of a central portion and two end portions, the end portions being made so as to expand the central portion by progressively deviating from the principal axis of the device, and each comprising at least one part in contact with the mechanically deformable cladding of the optical fiber when the clamping jaw occupies a clamping position.

Preferably, the diameter left free by the clamped jaws is at most slightly greater than the diameter of the single core of the fiber. Thus, during the clamping, this core being much harder than the mechanical cladding of the fiber, it is essentially the latter that is deformed.

According to another variant of the present invention, a so-called phase-step, Bragg grating optical fiber, as described in the doctoral thesis of the University of Paris-Sud, Centre d'Orsay, defended on Nov. 24, 1999 by Mr. Christophe Martinez and entitled "Study and Utilization of Bragg Grating Components in Optical Fibers," which has a typical spectral width of 25 pm at mid-height of its central peak to be compared with the 300 pm of a standard Bragg grating, which makes it possible to improve the measuring resolution of the device, is used.

More precisely, such a device comprises at least one phase-step Bragg grating and, for the reading of its Bragg wavelength $\lambda_{Bsaut}$, is associated with a second apodized Bragg grating, whose filtering strip includes all the Bragg wavelengths $\lambda_{Bsaut}$ that the phase-step grating can take in its entire measurement range.

A microstructured optical fiber, which is also called a photonic crystal fiber, whose structure has, longitudinally to its optical axis, holes distributed in the section of the fiber, spaced apart from one another and capable of being either empty, or filled with a material capable of conferring on this optical fiber a greater effective index than in the absence of the microstructure, is used according to another variant. It is then possible to inscribe a Bragg grating in this fiber, when, for example, its optical core is doped with germanium $GeO_2$, according to the usually known methods, at a characteristic wavelength $\lambda_B$.

The advantage which is gained by the increase in the effective index brought about by this microstructure, which may be a few percent, making it possible to increase the effective index of the fiber from a value of 1.46 to 1.50, for example, makes it possible to increase the sensitivity to any effect on the external parameters of the thus inscribed Bragg grating of the same order of magnitude.

BRIEF DESCRIPTION OF THE DRAWINGS

Other features and advantages of the present invention shall become apparent with the specification provided below using the attached figures, in which:

FIG. 5 shows a use of a sensor according to the present invention for the measurement of the force exerted on a pantograph, among others, by its catenary line.

DETAILED DESCRIPTION

Figure 1A:
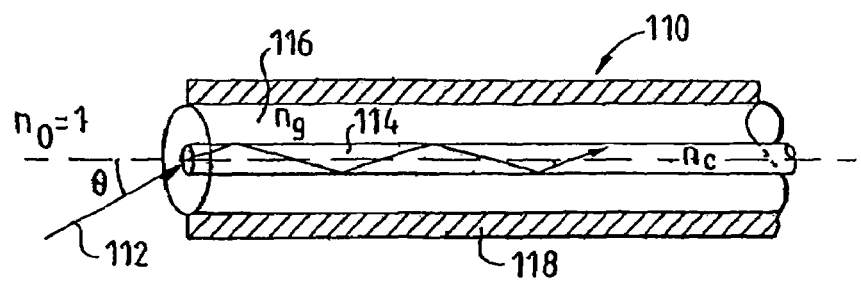
FIGS. 1a and 1b, already described, show an optical fiber and its previous known use in a force sensor, FIG. 2, already described, is a graph showing the longitudinal elastic deformation curves for different materials.
Figure 1B:
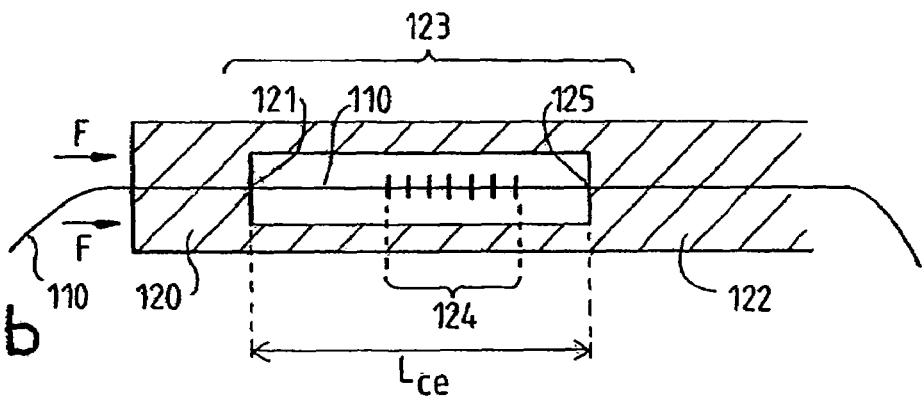

A first embodiment is described below with reference to FIG. 3, which shows a device 300 for measuring forces according to the present invention.

To determine the force applied on the test body 302 of this device, the longitudinal deformation $\Delta\epsilon_{ce}$ of the latter is measured by means of a Bragg grating 306 optical fiber 304.

Knowing the thermomechanical properties of the test body, it is possible to determine the variation in load $\Delta\sigma$ exerted on the device from the measurement of its longitudinal deformation $\Delta\epsilon_{ce}$, obeying, in elastic mode, Hooke's law:

$$\Delta\sigma = E \cdot \Delta\epsilon_{ce}$$

where E is the modulus of elasticity of the material used for the test body. Knowing the section S of this test body at the location where the longitudinal deformation $\Delta\epsilon_{ce}$ is measured, the variation in force $\Delta F$ exerted on same is deduced according to equation:

$$\Delta F = \Delta\sigma \cdot S$$

In practice, the section S of this test body is not necessarily constant. It is sufficient that the force or the uniaxial load, aligned with the direction of the section of fiber stressed, is applied on a section of this test body between two plane sections S1 and S2 perpendicular to the measurement axis, continuous or inconstant, and defined as follows:

they are facing one another so that the application of the force or the load does not induce any moment of rotation on the test body, these sections are used as supports for the devices for fixing the section of fiber and impose its elongation on it, the section lying between S1 and S2 is caused to deform at any point elastically but never reaching the range of plastic deformations.

$L_{ce}$ is hereinafter called the distance between these two plane sections S1 and S2, which are at right angles to the direction of the stressed fiber section. Functionally, it constitutes the effective length of this test body.

Furthermore, it should be noted that the longitudinal deformation $\Delta\epsilon_{ce}$ measured is uniaxial, i.e., it is measured along a single axis more or less corresponding to the axis of the optical fiber 304. This device is consequently particularly beneficial for measuring uniaxial deformations or loads.

The infinitesimal longitudinal deformation $d\epsilon_{ce}$ of the effective length of the test body may thus be defined by the equation:

$$d\epsilon_{ce}=dL_{ce}/L_{ce} \quad (3)$$

where $dL_{ce}$ represents the infinitesimal variation in the effective length of the test body and $L_{ce}$ represents the effective length of the test body during elongation.

By integrating equation (3), we obtain:

$$\Delta\epsilon_{ce}=ln\,[1+(\Delta L_{ce}/L_{0ce})] \quad (4)$$

where $\Delta L_{ce}$ represents the sum of the infinitesimal variations in length of the test body $dL_{ce}$, $L_{0ce}$ represents the effective length of the test body before elongation, $\Delta\epsilon_{ce}$ represents the sum of the variations in infinitesimal longitudinal deformations $d\epsilon_{ce}$ of the test body corresponding to the elongation $\Delta L_{ce}$, ln being the natural logarithm to the base e~2.71828182846 such as ln(e)=1.

Analogously, the infinitesimal longitudinal deformation $d\epsilon_{fib}$ of the section of Bragg grating optical fiber used for measuring deformations may be defined by the equation:

$$d\epsilon_{fib}=dL_{fib}/L_{fib} \quad (5)$$

where $dL_{fib}$ represents the infinitesimal variation in the effective length of the test body, $L_{fib}$ represents the effective length of the test body during elongation.

By integrating equation (5), we obtain:

$$\Delta\epsilon_{fib}=ln[1+(\Delta L_{fib}/L_{0fib})]=ln[(1+\xi(\Delta L_{ce}/L_{0fib})] \quad (6)$$

where $L_{0fib}$ is the initial basic length of the optical fiber and $\xi$ is a factor almost equal to 1.

This new equation (6) may also be written so as to reveal a factor K equal to the quotient of the initial length $L_{0ce}$ of the test body to the initial length $L_{0fib}$ of the optical fiber, this quotient being multiplied by the factor $\xi$ ($K=\xi(L_{0ce}/L_{0fib})$):

$$\Delta\epsilon_{fib}=ln\,[1+\xi(L_{0ce}/L_{0fib})(\Delta L_{ce}/L_{0ce})]=ln[(1+K\cdot(\Delta L_{ce}/L_{0ce})] \quad (7)$$

Finally, assuming that the longitudinal deformation $\Delta\epsilon_{ce}$ of the test body is approximately less than 1, it is possible to bring about a serial expansion to the order 1 of the expression (7) to obtain equation (8) below:

$$\Delta\epsilon_{fib}=K\cdot\Delta\epsilon_{ce}+0(K\cdot\Delta\epsilon_{ce}) \quad (8)$$

Thus, the deformation measured by the Bragg grating optical fiber 304 is amplified, in the first order, by a factor K equal to the quotient of the deformation $\Delta\epsilon_{fib}$ of the section of the optical fiber 304 used to carry out the measurements, to the deformation $\Delta\epsilon_{ce}$ of the test body 302.

By selecting a suitable K ratio, it is thus possible to amplify the deformations of the test body 302 measured by the optical fiber 304 by this factor K in order to obtain an improved measurement resolution.

Generally, a device according to the present invention will have a greater amplification factor, since the conditions below are confirmed:

the product of the modulus of elasticity of the material constituting the test body and the shortest section subjected to deformation is the lowest possible, without, however, enabling this test body to become deformed at any of its points in a plastic manner, the effective length of the test body $L_{0ce}$ is the greatest possible for a given length of the section of fiber $L_{0fib}$.

Moreover, if it is natural for the person skilled in the art to design a test body with a constant section, the present invention also makes it possible to use test bodies having variable sections since its behavior at any point between the sections S1 and S2 remains within the elastic range without ever reaching the range of plastic deformations.

To obtain a K ratio greater than one, the device 300 comprises two projecting elements 310, facing one another, fixing the optical fiber 304 at a first end 312 and at a second end 314, such that the length at rest $L_{0fib}$ of the section of optical fiber subjected to elongations is less than the effective length at rest $L_{0ce}$ of the test body bringing about these elongations.

Figure 3:
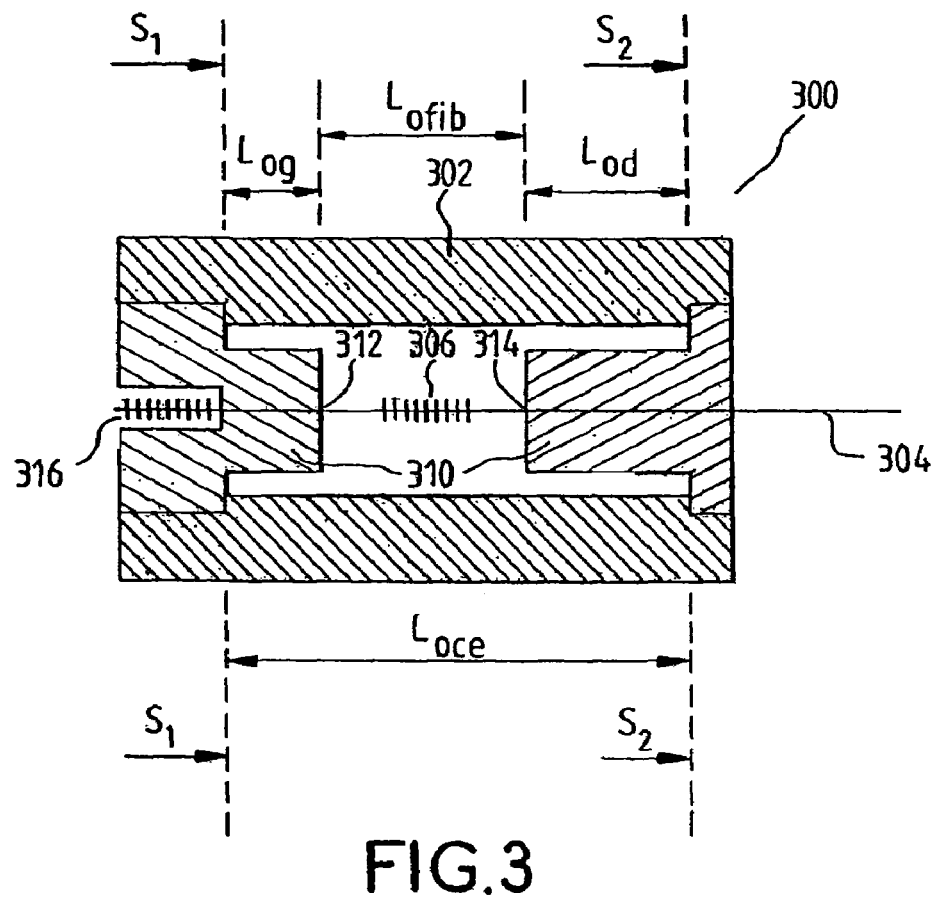
FIG. 3 is a diagram of a first measuring device according to the present invention, which is designed for measuring forces.

It should be pointed out that a measuring device as described in FIG. 3 has the advantage, compared with a deformation gauge fixed on a test body, of making possible the use of projecting elements, or projections 310 reducing the length of the optical fiber subjected to elongations.

In this preferred embodiment these projecting elements are undeformable to external actions to be measured to which the test body is subjected, which makes it possible, in particular, to fix the K ratio independently of the properties of the materials comprising these projections.

The effective index $n_e$ and the pitch $\Lambda$ of the Bragg grating 306 are dependent on the temperature. So as to compensate the effects of the temperature on the spectral measurement, a second Bragg grating 316 is used, which is placed at the same temperature as the first Bragg grating 306, whose variations in deformations are only due to the thermal expansion induced by variations in temperature.

In other words, this second Bragg grating 316 is not sensitive to deformations of mechanical origin of the test body, so that, from the knowledge of the spectral measurement of its characteristic Bragg wavelength, it is possible to correct the spectral measurements of the first Bragg grating 306 so as to compensate the effects of the temperature on the effective index $n_e$ and the pitch of the grating $\Lambda$.

Figure 4:
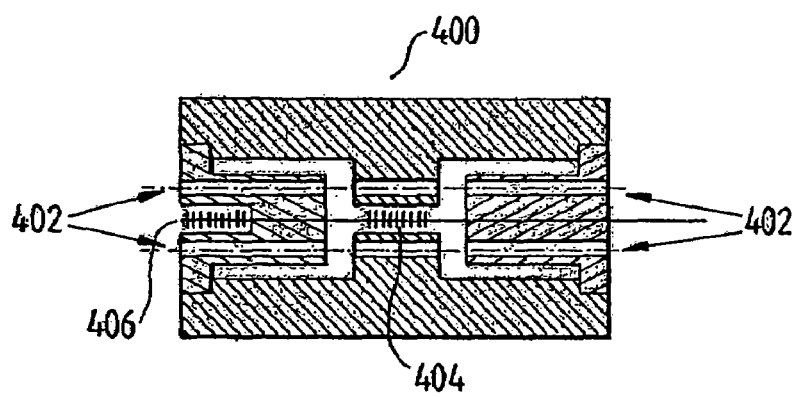
FIG. 4 is a diagram of a second measuring device according to the present invention.

According to a variant, shown in FIG. 4, a force-measuring device 400 comprises means 402, such as air ducts, intended for homogenizing the temperature within the device, and especially between the Bragg grating 404 intended for the measurement of the force and the second Bragg grating 406 intended for the compensation of the thermal effects of the first Bragg grating.

It is important to remark that FIGS. 3 and 4 show test bodies having different shapes, and in particular they do not have a constant section over their elongation length.

Furthermore, as indicated above, an amplification ratio K should be selected such that the deformation of the optical fiber does not reach its rupture limit.

For this purpose, it is recalled that an optical fiber with silica $SiO_2$ matrix has an elastic limit in longitudinal deformations on the order of 5% under tension and at least 15% under compression as specified in the article by G. A. Ball and W. W. Morey, which appeared on Dec. 1, 1994 in the journal *Optics Letters,* Volume 19, No. 23 and is entitled "Compression-tuned single-frequency Bragg grating fiber laser."

Furthermore, a plastic optical fiber has a generally greater elastic limit in longitudinal deformations under tension with a rupture limit under tension currently capable of exceeding 100%. Such an elasticity is due to the phenomenon of structural hardening of the polymer matrix brought about by the preferable alignment with the direction of application of the force of the macromolecular chains of the polymer.

Figure 2:
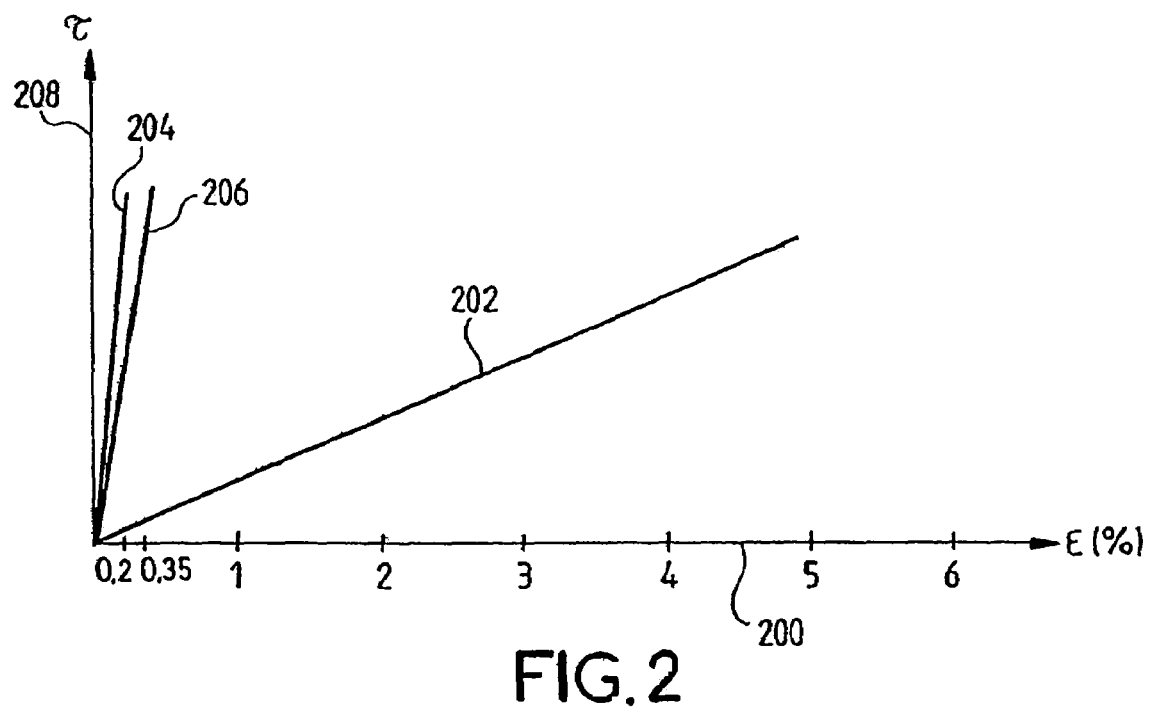

As described above with reference to FIG. 2, these values are markedly greater than those of a compound, such as a metal, ceramic or piezoelectric material capable of forming the test body, whose deformations must remain in the elastic range so as not to present a measurement error.

Typically, this elastic limit in uniaxial deformation is on the order of 0.2% for standard steel and 0.35% for a high-yield-point steel. In the particular example of a test body made of steel whose elastic limit is close to 0.2% and equipped with an optical fiber with silica $SiO_2$ matrix, in which a Bragg grating is inscribed, it is possible to reach an amplification factor K greater than 25 ($K \geq 5/0.2$) for use of the optical fiber only under tension, and greater than 100 ($K \geq (5+15)/0.2$) if this fiber is used under compression.

With the ability of a plastic optical fiber to be able to be elongated even more being given, this amplification factor K may be even greater in the case of the use of a plastic optical fiber.

Furthermore, when the test body is made of a material having only very low deformations, the present invention makes it possible to amplify the latter for carrying out their measurement.

Such is the case, in this second example, of the bow supports of a pantograph, whose longitudinal deformations induced by the vertical loads exerted on it, particularly, by the catenary wire, are on the order of $10^{-4}$%, i.e., an elongation of one micrometer for a length of one meter, even though their elastic deformation limit is on the order of 0.2%.

According to another example, this amplification may be used on a force cell used with a device for rheological tests, under traction and/or compression, on a material, whose measurement range and resolution may be amplified with the advantage of a unidirectional measurement independent of the Poisson lateral contraction effects.

As the present invention makes it possible to increase the sensitivity of the measurement, it is especially suitable in the cases in which the test body cannot display deformations of the extent usually used in extensometry, for example, when it is necessary to introduce the least possible plasticity or brittleness.

Consequently, it is possible to fix a Bragg grating optical fiber at two points of a test body, so that the variations in deformations of this test body are transmitted in an amplified manner with respect to the Bragg grating optical fiber, the amplification factor K being selected such that the rupture limit of the optical fiber is not reached.

A device according to the present invention has increased measurement resolution compared with a prior-art device since the relative longitudinal deformations of the portion of optical fiber located between these two elements are, for identical elongations of the measurement body, wider than with a classical device.

In other words, the sensor must be dimensioned so that the deformation experienced by the Bragg grating optical fiber is less than its tolerance limit, i.e., less than the maximum level of admissible deformations, whose value depends on the desired service life of the device.

The Weibull conditions, e.g., described in the article by Mr. Jean Phalippou entitled "Glass, Properties and Applications," AF 3 601, "Basic Sciences" Treatise, Techniques de l'Ingenieur, 249, Rue de Crimee, F-75925 Paris Cedex 19 can be used to define this value.

The dimensioning and the selection of the elements forming the device 300 may also take into account the relationship between the variation in force $\Delta F$ applied on the test body and the variation in mechanical deformation $\Delta \epsilon_{fib}$ of the optical fiber.

For this purpose, it is possible to consider, for example, for a test body tube of cylindrical geometry, that the variation in mechanical deformation $\Delta \epsilon_{fib}$ of the optical fiber is measured by an equation of the type:

$$\Delta \epsilon_{fib} = \ln[1 + \xi (L_{0ce}/L_{0fib}) \cdot (\exp(\Delta F/(\pi \cdot E_t \cdot (\phi_{0t} - e_{0t}) \cdot e_{0t})) - 1)] \quad (9)$$

where $\Delta F$ is the variation in external force applied on the test body, $E_t$ is the modulus of elasticity of the test body tube, $\phi_{0t}$ is the external diameter of the tube used for the test body, $e_{0t}$ is the thickness of this tube and $\xi$ is a constant considered to be equal to one below.

Equation (9) can be considered to be a function $f(u,v)$ of two variables u and v, such that:

$$t = f(u,v) \quad (10)$$

which can be studied mathematically by considering the parameters t, u, v and j defined according to the equations:

$$t = \Delta \epsilon_{fib}, \ u = \xi \cdot (L_{0ce}/L_{0fib}) = K, \ v = \Delta F/[E_t \cdot (\phi_{0t} - e_{0t}) \cdot e_{0t}]$$

and j, which represents a clearance between the test body and the support device of the fiber making possible its assembly.

Such a study was carried out on the definition range $Df_{\{u,v\}}$ of the function f, i.e., the range of values admissible for u and v:

$$Df_{(u,v)} = \left[\frac{\min(L_{0ce})}{\max(L_{0fib})}, \frac{\max(L_{0ce})}{\min(L_{0fib})}\right] \times \left[\frac{4 \min(\Delta F)}{\max(E_i)[\max^2(\phi_{0t}) - 4\min^2(j)]}, \frac{\max(\Delta F)}{\min(E_i)[\min(\phi_{0t}) - \min(e_{0i})]\min(e_{0i})}\right] \quad (11)$$

By considering the values indicated in Tables 1 and 2 at the end of the present specification, the study of this function made it possible to determine the optimal conditions $\{u,v\}_{opt}$ for which the longitudinal deformation of the optical fiber $\Delta \epsilon_{fib}$ is maximum, expressing the maximum amplification conditions of the mechanical deformation of the test body, i.e.:

$$\{u,v\}_{opt} = \left\{\frac{\max(L_{0ce})}{\min(L_{0fib})}, \frac{\max(\Delta F)}{\min(E_t)[\min(\phi_{0t}) - \min(e_{0t})]\min(e_{0t})}\right\} \quad (12)$$

The maximum of the longitudinal mechanical deformations of the optical fiber is thus obtained for conditions, such as:

$$\max(\Delta \epsilon_{fib}) = \ln\left[1 + \frac{\max(L_{0ce})}{\min(L_{0fib})}\right]. \quad (13)$$

-continued $$\left(\exp\left[\frac{\max(\Delta F)}{\pi\min(E_t)[\min(\phi_{0t})-\min(e_{0t})]\min(e_{0t})}\right]-1\right)\right]$$

Figure 5A:
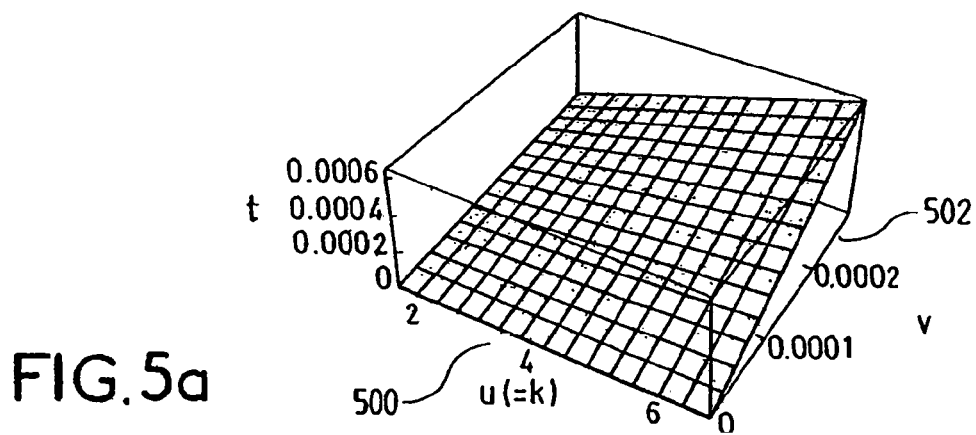
FIG. 5a shows the 3D surface of the function t=f(u,v) of the variation in mechanical deformations of the optical fiber t=$\Delta\epsilon_{fib}$ depending on the amplification factor K=u and on the variation in mechanical deformation of the test body v=$\Delta\epsilon_{ce}$ for a set of pairs {u,v} admissible for an application of the sensor in a pantograph.

The numerical result of the study of this function is shown in FIG. 5a as a function of u=K (axis 500), v (axis 502) and the value of the mechanical deformation $\Delta\epsilon_{fib}$ obtained.

Equation (13) makes it possible to define, among the candidate materials for the specific application given, optimal conditions for amplification of the longitudinal deformations of a Bragg grating optical fiber according to the present invention, i.e.:

- a test body tube having the smallest possible modulus of elasticity $E_t$,
- the greatest possible effective length of the test body tube $L_{0ce}$,
- the smallest possible external diameter of the test body tube ($\phi_{0t}$,
- the smallest possible thickness of the test body tube $e_{0t}$.

Figure 5B:
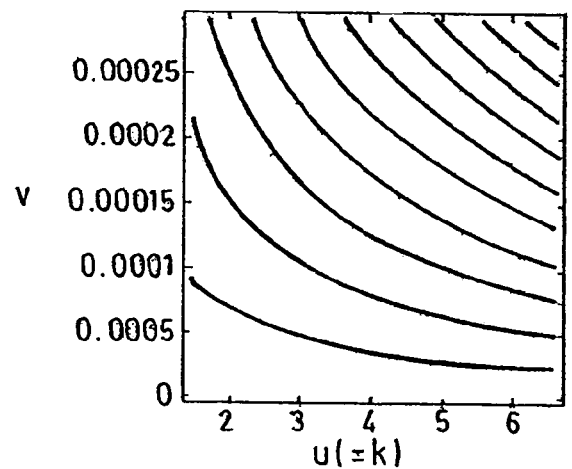
FIG. 5b shows the mechanical iso-deformation curves of the surface shown by the curve of FIG. 5a for a set of pairs {u,v} admissible for an application of the sensor in a pantograph, FIG. 6a schematically shows a force-measuring system comprising a plurality of sensors according to the present invention, FIG. 6b schematically shows a force-measuring device comprising a plurality of optical fibers aligned with the same axis, whose Bragg gratings intended for the measurement of mechanical deformations are in the same plane, according to the present invention, and, moreover, making torque measurement possible, FIG. 6c schematically shows a temperature-measuring device with a single Bragg grating kept preloaded and integral with the test body, FIG. 6d schematically shows a measuring device preferably intended for measuring deformations of mechanical origin, whose Bragg grating intended for the compensation of thermal effects is kept preloaded and integral with the test body, FIG. 6e schematically shows a measuring device preferably intended for measurement of deformations, whose Bragg grating intended for measurement of deformations of mechanical origin is kept in a cladding, preventing its buckling, FIG. 7a schematically shows a cross section of the specific chuck, making it possible, according to a preferred embodiment, to fix the ends of the section of optical fiber subjected to the deformation to be measured, FIG. 7b schematically shows an axial section according to the plane III-III of the specific chuck according to FIG. 7a, and FIGS. 8a, 8b and 8c show various groove base profiles that can be used in the present invention to mechanically block the optical fiber in its support device.

Furthermore, the functions indicated above make it possible to determine the set of pairs {u,v}, making it possible to obtain an optical fiber deformation $\Delta\epsilon_{fib}$, given for a given amplification factor K, as shown in FIG. 5b, which is an example of mechanical iso-deformation curves.

The lengths $L_{0g}$ and $L_{0d}$ of the two projecting elements 310 for fixing the optical fiber, $L_{0ce}$ of the test body as well as the length $L_{0fib}$ of the optical fiber can be determined in a particularly optimal manner, like the coefficients of expansion or of thermal expansion $a_{ce}$ of the test body, $a_g$ of the left-hand projecting element 310, $a_d$ of the right-hand projecting element 310 and $a_f$ of the optical fiber.

In fact, the compensation of mechanical loads having the thermal expansion of the different components of the sensor as their origin leads to selecting coefficients of thermal expansion which best comply with the equation:

$$a_{ce} \cdot L_{0ce} = a_g \cdot L_{0g} + a_f \cdot L_{0fib} + a_d \cdot L_{0d}$$

On the other hand, to limit the measurement errors generated by the irreproducible shearing mechanical behavior of the protective polymer cladding of the optical fiber when same is subjected to a mechanical deformation under tension or under compression and kept clamped in its projecting fixing elements 310, it appears that the lengths $L_{0ce}$ of the test body, $L_{0g}$ and $L_{0d}$ of the left and right projecting fixing elements of the optical fiber and $L_{0fib}$ of the optical fiber must at best comply with the equation:

$$L_{0g} = L_{0d} = L_{0fib}/2 = L_{0ce}/4$$

In fact, such an equation makes it possible to minimize the shearing effects of the polymer cladding of the optical fiber, and more generally of any deformable coating, and to increase the service life of this optical fiber while complying with the Weibull conditions already mentioned.

As an example, a device meeting the criteria mentioned above might comprise a test body made of Duralumin AU4G ($E_t$~73 GPa), an effective length of the test body ($L_{0ce}$) of 20 mm, an external diameter of the test body ($\phi_{0t}$) of 6.2 mm, a thickness of the test body ($e_{0t}$) of 1 mm, an optical fiber length ($L_{0fib}$) of 3 mm and a length of the projecting elements fixing the test body ($L_{0g}$ and $L_{0d}$) of 8.5 mm each.

According to another use of a device according to the present invention, the conditions are determined such that the mechanical elongation of thermal origin induced on the optical fiber by the test body and the two support devices is amplified in order to improve the measurement resolution of variations in temperatures.

Thus, instead of attenuating the mechanical effects induced by the variation in temperature on the optical fiber, which is not the configuration sought when the device is configured for the preferred measurement of a mechanical deformation or a force, the device is configured according to conditions, such that the optical fiber has strong variations in deformations of mechanical origin in case of variations in the temperature.

To that end, the test body should have the greatest possible coefficient of thermal expansion $a_{ce}$, and particularly greater than the coefficient of thermal expansion $a_f$ of the optical fiber and greater than those $a_g$ and $a_d$ of the two fixing elements 310 of the optical fiber.

The total deformation, i.e., the sum of the deformations of mechanical and thermal origin of the Bragg grating optical fiber, is thus the amplified result of the thermal deformation of the test body, thereby making possible a better resolution of the measurement of the temperature by the Bragg grating.

Furthermore, so that this amplification is the greatest possible for the same device geometry, it is necessary for the coefficients of thermal expansion $a_g$ and $a_d$ of the two fixing elements of the optical fiber to be equal and as low as possible.

Figure 6A:
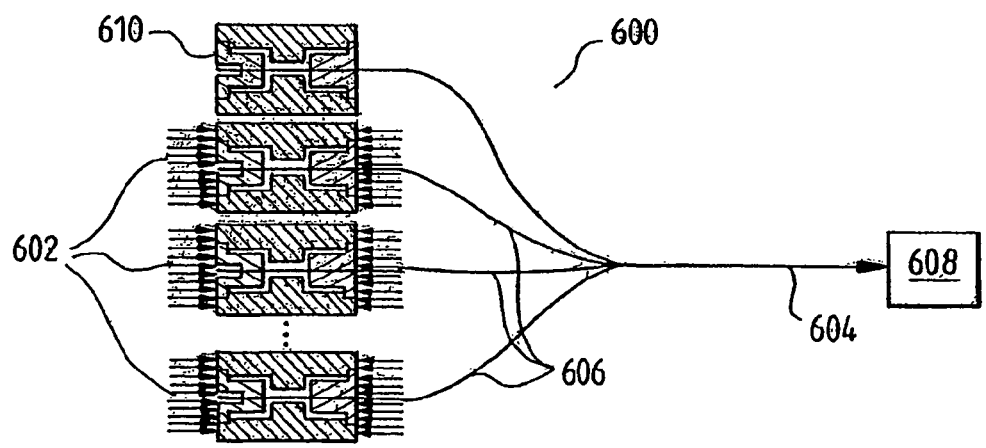
Figure 6B:
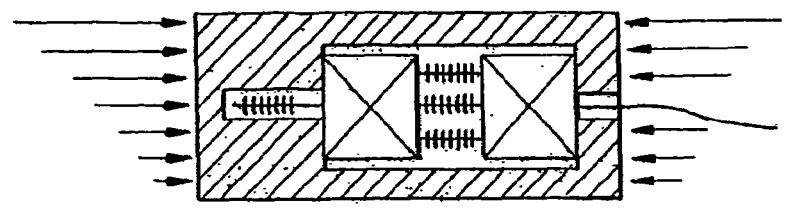
Figure 6C:
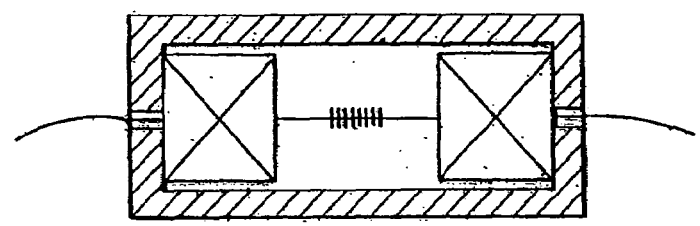

It is to be noted that in this particular case in which only the measurement of the temperature is sought, it is not indispensable, as shown in FIG. 6c, to provide the device with a thermal compensating Bragg grating as shown in FIG. 4.

This configuration makes it possible to make use of the advantages gained by a serial use of such temperature sensors: use of a single fiber, without the need to use devices such as optical couplers to bring about branchings peculiar to each sensor shown in parallel, having the effect, with each division of the optical circuit, of dividing among each of the branches the total optical power transmitted through the optical fiber.

In one embodiment of the present invention, a measuring system 600 (FIG. 6a) is used, comprising different devices 602 according to the present invention arranged in parallel to bring about various measurements. Such an application has the advantage of being able to be performed by means of a single optical fiber 604, having branchings 606 peculiar to each device 602, within which is transmitted an electromagnetic radiation according to different wavelengths.

Consequently, considering that each device has at least one distinct Bragg wavelength, it is possible to process the spectrally multiplexed data related to each device 602 by the same spectral analysis system 608 (not shown in detail). This system 608 may be transported far away from the measurement points.

It is also possible to embody a measuring system comprising a plurality of distinct optical fibers, each comprising at least one device according to the present invention. In this case, the reading of the various fibers is performed sequentially by temporal demultiplexing, the reading of the characteristic wavelengths of each of their Bragg grating(s) being performed by spectral demultiplexing as already mentioned.

To compensate the thermomechanical behavior dispersions between the devices, which may come from a dispersion during their manufacturing process, it is possible to use a device 610 that is insulated from external mechanical loads and is only subjected to variations in temperature as a reference device in order to reference the measurements supplied by the other devices subjected, as for them, to external loads or deformations to be measured.

According to an embodiment of the present invention, a plurality of Bragg gratings are used within a test body so as to define a deformation of this test body from an average of the longitudinal deformations measured by each Bragg grating.

Such an embodiment has the advantage of providing a measurement of better resolution of the value sought in a ratio 1/root (n), where n is the number of Bragg gratings in question.

This embodiment can be implemented by means of a section of optical fiber comprising a plurality of Bragg gratings or by means of a plurality of sections of Bragg grating optical fibers.

In the latter case, according to the force-measuring device shown in FIG. 6b, if these Bragg grating optical fibers are in the same plane, aligned according to the same direction, it is possible to use the measurements supplied by each of the Bragg gratings to determine the value of a torque being exerted on the test body perpendicularly to the plane defined by the optical fibers.

To that end, the average mechanical deformation measured by each of these Bragg gratings for all the optical fibers makes it possible to evaluate the value of the uniaxial load having led to this average mechanical deformation, on the one hand, while, on the other hand, the deviations from this average value of each of the deformations measured by each fiber make it possible to evaluate the value of the torque being exerted on the test body perpendicularly to the plane defined by the optical fibers.

The fixing of the optical fiber to the test body is of great importance for the reliability of the measurements and their reproducibility. To that end, it seems preferable to use a method of fixing the optical fiber to the test body by means of a mechanical pinching, which has various advantages such as the maintenance of the clamping zone, the easy removal of the fixing, for example, to mechanically preload the optical fiber in a precise manner, thus avoiding subjecting the optical fiber to needless and harmful mechanical deformations for its service life, the small size of the device and possibility of using various groove profiles for wedging the fibers.

Figure 7A:
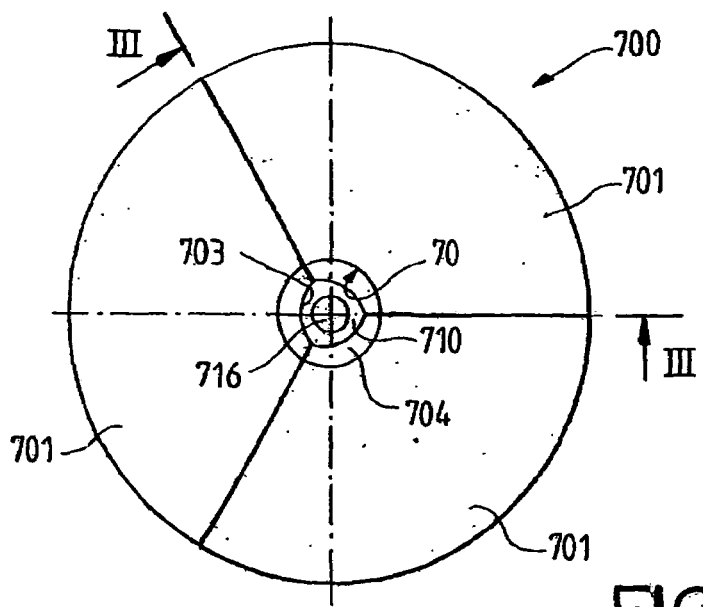
Figure 7B:
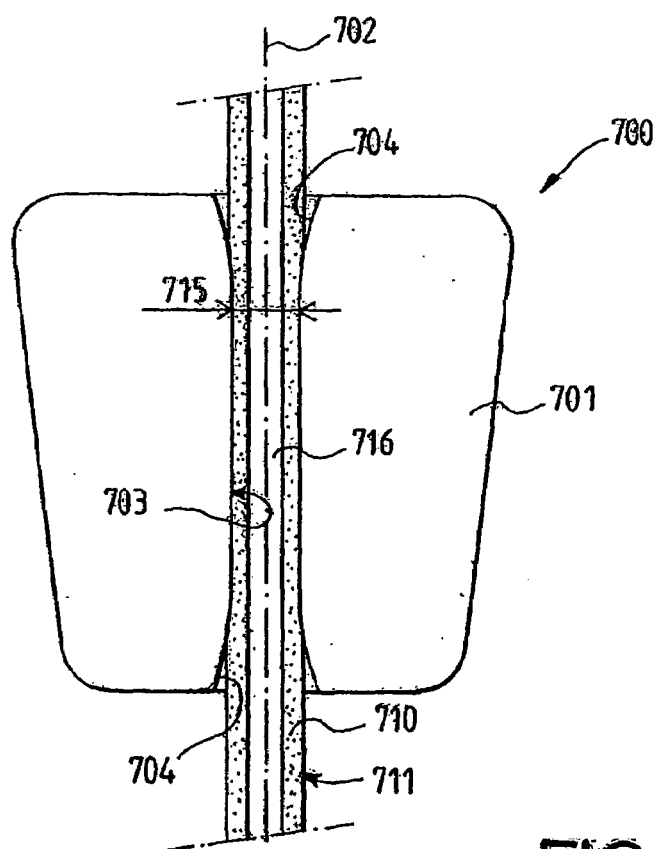

Moreover, the use of a specific fixing chuck 700 (FIGS. 7a and 7b), comprising three clamping jaws 4 having a progressive curvature 704 at the end of the clamping device, makes it possible to maintain, without sliding, an optical fiber with particularly high tension or compression forces being exerted on same without damaging it.

This specific device 700 comprises at least three clamping jaws 701 distributed around a principal axis 702 merged with the axis of the fiber, each clamping jaw comprising an internal surface consisting of a central portion 703 and two end portions 704, the end portions being made so as to extend the central portion by progressively deviating from the principal axis of the device, and each comprising at least one part in contact with the mechanically deformable cladding 710 of the fiber 711 when the clamping jaw occupies a clamping position.

At its maximum clamping position, this device has a diameter 715 left free by the clamped clamping jaws that is at most slightly greater than the diameter of the single core 716 of the fiber.

A plurality of Bragg gratings may be inscribed in succession in the same fiber. If the Bragg wavelengths $\lambda_{B1}, \lambda_{B2}, \ldots \lambda_{Bn}$ of these gratings are spaced far enough apart from one another, these wavelengths $\lambda_{B1}, \lambda_{B2}, \ldots \lambda_{Bn}$ can easily be dissociated without interfering with one another so as to use a single fiber to carry out various measurements.

The measurement is carried out by detecting either the wavelength of the light reflected towards the source by the Bragg grating (detection by reflection), or the short wavelength in the light transmitted at the distal end of the optical fiber (detection by transmission).

Figure 8A:
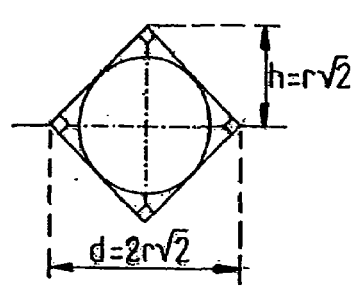
Figure 8B:
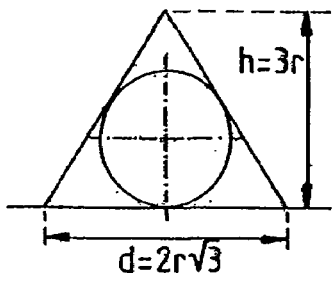
Figure 8C:
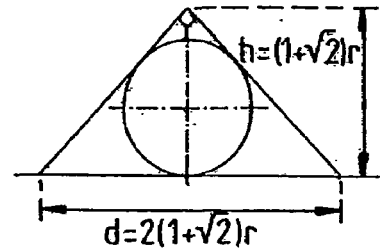

The groove base profiles that can be used to maintain an optical fiber are, in the order of preference, ideally a circular profile, and taking into account the machining difficulties and costs, a square profile (FIG. 8a), an equilateral profile (FIG. 8b) and a right-angle profile (FIG. 8c), which have the advantages of being simpler to create.

Any other, more complex groove base profile (for example, with N sides) may be used, but its advantage in terms of mechanical maintenance or of low mechanical damage to the optical fiber remains limited compared with the above groove base profiles.

The plastic deformation of the portion or of the section of optical fiber in question, if same is possible, is permitted in such a device, providing, however, that this portion of optical fiber thus deformed does not display buckling, which is the case if the optical fiber is always stressed under tension.

This may be particularly advantageous in the case of plastic optical fibers whose matrix is, by nature, made of a nonbrittle material and whose range of plastic deformations is very extensive.

If the mechanical tension of this portion of optical fiber passes zero during the elastic return of the test body or during its reciprocal mechanical stressing (tension or compression) and shows a beginning of buckling, the measurement thus produced by the Bragg grating is no longer related to that of the test body and becomes uninteresting.

It then remains possible (FIG. 6e) to package the portion of optical fiber 656 comprising at least one Bragg grating intended for the measurement of mechanical deformation in a deformable guide device 652, for example, a tube having an internal diameter close to the external diameter of the optical fiber, so that it can no longer buckle, making it possible to continuously extend its longitudinal mechanical deformation under compression: in this case, the optical fiber being always mechanically guided along the same axis, its deformation is always in the same direct relationship with that of the test body 653 by means of the factor K.

This particular packaging of the optical fiber, which makes possible its stressing under compression, has the advantage of being able to exploit, in addition to the range of longitudinal deformations under tension, the range of longitudinal deformations under compression of the optical fiber, increasing the range of accessible measurements accordingly.

For example, the range of elastic deformations under compression of an optical fiber with a silica $SiO_2$ matrix is at least three times more extensive than its range of elastic deformations under tension, making it possible to multiple by at least four the measurement range potentially accessible by means of the factor K, and consequently, the measurement resolution of the device.

The possible presence of a residual plastic deformation on the Bragg grating optical fiber does not degrade the amplification factor K in a first approximation, but may displace the median point of the measurement range if the buckling of this portion of optical fiber is not contained.

Figure 6D:
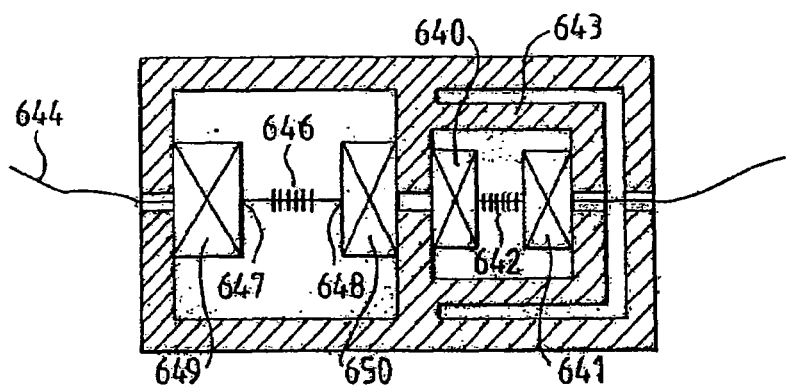
Figure 6E:
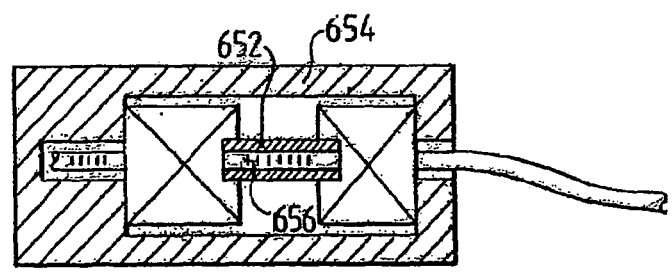

According to another embodiment of a device preferably intended for the measurement of deformations of mechanical origin (FIG. 6d), the optical fiber 644 is equipped:

with at least one Bragg grating 642 insulated from external mechanical actions being exerted on the device intended for the compensation of thermal effects and package so as to be kept under mechanical tension between two support devices 640 and 641, at least one of which is projecting, and at least one Bragg grating 646 kept under a negative, positive or zero mechanical preload by two support devices 649 and 650, at least one of which is projecting, and aligned with its two anchoring points 647 and 648, characterized in that this fiber portion may be kept guided in an antibuckling support device as described in FIG. 6e.

TABLE 1

Examples of input data of the user

| Data | Variable | Min | Nominal | Max |
|---|---|---|---|---|
| Total dynamics of loads | ΔF | 0 N | | 500 N |
| Desired resolution | δΔF | | 1 N | |
| Number of measurement points in the range ΔF | | | 50 | 100 |

TABLE 2

Examples of material data and dimensions considered

| Data | Variable | Min | Nominal | Max |
|---|---|---|---|---|
| Coefficient of thermal expansion | $\alpha_{ce}$ | $0.5 \times 10^{-6}$ K$^{-1}$ | | $25 \times 10^{-6}$ K$^{-1}$ |
| Modulus of elasticity | $E_t$ | 73 GPa (Duralumin) | | 210 GPa (steels) |
| Height of the test body tube | $L_{0ce}$ | 15 mm | | 20 mm |
| External diameter of the test body tube | $\phi_{0t}$ | 6.2 mm | | 20 mm |
| Thickness of the test body tube | $E_{0t}$ | $\begin{cases} \min\left(\varepsilon_{\min}, \frac{\phi_{0t}-d}{2}\right) - j \\ \varepsilon_{\min} = 1 \text{ mm} \end{cases}$ | | $\begin{cases} \min\left(\varepsilon_{\min}, \frac{\phi_{0t}-d}{2}\right) - j \\ \varepsilon_{\min} = 3 \text{ mm} \end{cases}$ |
| Diameter of the support device | d | 4 mm | | |
| Clearance between the tube and the support device | j | | 0.1 mm | |
| Basic length of the fiber | $L_{0fib}$ | 2 mm | 4 mm | 10 mm |

This device configuration has the dual advantage:

of making possible a serial multiplexing of such devices because the Bragg grating 642 intended for the compensation of the thermal effects is completely insulated from the external mechanical actions being exerted on the device, which makes it possible to make use of the intrinsic advantages gained by such a use: use of a single fiber, without the need to use devices such as optical couplers, to bring about branchings peculiar to each sensor mounted in parallel, having the effect, with each division of the optical circuit, of dividing among each of the branches the total optical power transmitted through the optical fiber.

of improving the precision of the device, because the thermal compensation of such a device integrates, in addition to the previous solutions by means of the structure 643, the effects of the thermal expansion of the test body being exerted in a similar manner on the Bragg grating(s) 646 intended for the measurement of the mechanical deformation.

A concrete application example of the present invention lies in its use, within a pantograph, for measurement of the force being exerted on the latter by its action on a catenary.

In fact, the action of a catenary on a pantograph leads to a low deformation, which, thanks to the present invention, can be sufficiently amplified to be measured in order to check this action and thus to ensure an optimal contact between the pantograph and the catenary.

In Short:

1. The present invention thus pertains to a uniaxial deformation-measuring device comprising a section of optical fiber equipped with at least one Bragg grating aligned with the direction of the measurement axis, and a test body subjected to the deformations to be measured and transmitting same to the section of optical fiber, this device being intended to be placed into operating conditions under which the fiber is excited by a light wave comprising the Bragg wavelength or Bragg wavelengths which all the Bragg gratings inscribed in this fiber can reach and under which this fiber is connected to means for reading the Bragg wavelength of each of these gratings and comprising demultiplexing means, if there are a plurality of Bragg gratings, this device being characterized in that:

the fixing points, capable of subjecting this fiber section to a negative, positive or zero preload and of transmitting the elongations of the test body thereto, are separated by a distance ($L_{fib}$) having a variation ($\Delta L_{fib}$) when the test body is stressed by the deformation to be measured, the effective length ($L_{ce}$) of the test body has an elongation ($\Delta L_{ce}$) when the test body is stressed by the deformation to be measured, the length ($L_{fib}$) of the section of optical fiber and the effective length ($L_{ce}$) of the measurement body are such that the longitudinal deformation ($\Delta L_{fib}/L_{fib}$) of the section of optical fiber is strictly greater than the originating deformation ($\Delta L_{ce}/L_{ce}$) of the test body, thus defining an amplification factor K that is strictly greater than 1 and is equal to the quotient $(\Delta L_{fib}/L_{fib})/(\Delta L_{ce}/L_{ce})$ in the first order.

The device may also have the following features:

2. The length ($L_{fib}$) of the section of optical fiber is less than the length ($L_{ce}$) of the test body.

3. The variation in length ($\Delta L_{fib}$) of the section of optical fiber is equal to the variation in length ($\Delta L_{ce}$) of the test body.

4. The optical fiber comprises a plurality of Bragg gratings assigned to the measurement of the deformations of the same test body, and the length ($L_{fib}$) of the section of optical fiber is greater than the shortest distance along the optical fiber that comprises all these Bragg gratings.

5. The preload places the section of optical fiber under tension, and the deformations to be measured increase this tension.

6. The preload places the section of optical fiber under tension, the deformations to be measured reduce this tension, and the initial preload is sufficient for the section of optical fiber to always remain under tension even if it is subjected to the greatest deformation of its measurement range.

7. The preload places the section of optical fiber under compression, and this section of fiber is surrounded by an antibuckling device.

8. The antibuckling device comprises at least one section of a deformable rigid cladding surrounding the optical fiber and sliding on it with the lowest possible clearance, these sections being separated from one another by cylindrical or toric pieces made of sufficiently elastic material for allowing the greatest compressed deformation that the section of optical fiber can reach in its measurement range.

9. A device for measuring forces or mechanical loads comprises means capable of converting these forces or these mechanical loads into a uniaxial deformation measured by a device in accordance with one of the items 1 through 8.

10. The device according to item 9, additionally comprising a Bragg grating in a second section of optical fiber, this grating being uncoupled from external mechanical loads to be measured and subjected to the same temperature as the Bragg grating(s) of the first section intended for the measurement of the mechanical loads causing the deformation of the test body, in order to bring about a compensation of the thermal effects on the measurement.

11. A device for measuring temperatures comprises means capable of converting these temperatures into a uniaxial deformation measured by a device in accordance with one of the items 1 through 8.

12. The device comprises means capable of homogenizing the temperature of the Bragg gratings assigned to the same test body.

13. The means capable of homogenizing the temperature make possible the free circulation of a coolant.

14. The test body has a constant cross section.

15. The test body has a variable cross section.

16. The device comprises at least one projecting element, which is integral with the test body, to which the optical fiber is fixed, this projecting element being undeformable to the external actions to be measured to which the test body is subjected.

17. The test body, the optical fiber and the projecting element (or elements) confirm the equation:

$$a_{ce} \cdot L_{0ce} = a_g \cdot L_{0g} + a_f \cdot L_{0fib} + a_d \cdot L_{0d}$$

where $a_{ce}$ is the coefficient of thermal expansion of the test body and $L_{0ce}$ is its length, $a_g$ and $a_d$ are the coefficients of thermal expansion of the projecting element or elements, and $L_{0g}$ and $L_{0d}$ are their length[s], and $a_f$ is the coefficient of thermal expansion of the optical fiber and $L_{0fib}$ is its mechanical preloaded length between its two fixing points.

18. For any portion of optical fiber kept preloaded between two fixing devices, the test body, the optical fiber and the elements confirm the equation:

$$L_{0g} = L_{0d} = L_{0fib}/2 = L_{0ce}/4$$

where $L_{0ce}$ is the effective length of the test body, $L_{0g}$ and $L_{0d}$ are the length[s] of the projecting elements, and $L_{0fib}$ is the length of the optical fiber mechanically preloaded between the two projecting elements.

19. At each of its ends, the section of optical fiber is fixed to a fixing device comprising a specific chuck (700) comprising at least three clamping jaws (701) distributed around a principal axis (702) merged with the axis of the fiber, each clamping jaw comprising an internal surface consisting of a central portion (703) and two end portions (704), the end portions being made so as to extend the central portion by progressively deviating from the principal axis of the device, and each comprising at least one part in contact with the mechanically deformable cladding (710) of the fiber (711) when the clamping jaw occupies a clamping position.

20. The diameter (715) left free by the clamped jaws is at most slightly greater than the diameter of the single core (716) of the fiber.

21. The test body is integral with, or incorporated in, a pentagram.

22. A device for measuring forces or mechanical loads according to item 9 or 10, in which the product of the modulus of elasticity of the material constituting the test body and the shortest section subjected to deformation is the lowest possible, without, however, enabling this test body to be deformed at any of its points in a plastic manner.

23. A device for measuring temperatures in accordance with one of the items 11, 12 or 13, according to which the coefficient of thermal expansion of the test body, $a_{ce}$, is the greatest possible, and particularly greater than the coefficient of thermal expansion $a_f$ of the optical fiber and greater than those $a_g$ and $a_d$ of the two fixing elements (310) of the optical fiber.

24. A deformation-measuring system, comprising a plurality of optical fibers, each equipped with at least one device in accordance with one of the items 1 through 23, which comprises a temporal demultiplexing device making it possible to read the signals of each of the fibers in succession, and in that these signals are then demultiplexed spectrally to obtain the characteristic wavelength of each of the Bragg gratings.

25. A device according to one of the items 22 or 23, which measures the result of the external mechanical interactions acting on a pantograph.

The invention claimed is:

1. Uniaxial deformation-measuring device comprising a first section of optical fiber equipped with at least one Bragg grating aligned with the direction of the measurement axis, and a test body subjected to the deformations to be measured, the device being configured to be placed into operating conditions under which the optical fiber is excited by a light wave comprising the Bragg wavelength or Bragg wavelengths with which the at least one Bragg grating is inscribed wherein the first section of the optical fiber is connected to means for reading the Bragg wavelength of each of the at least one grating and comprising demultiplexing means, if the at least one grating includes a plurality of Bragg gratings, the device further comprising:

a plurality of fixing points, for attaching the first section of the optical fiber to the test body to subject the first section of the optical fiber to a negative, positive or zero preload and of transmitting the elongations of the test body thereto, the fixing points being separated by a distance ($L_{fib}$) having a variation ($\Delta L_{fib}$) when the test body is stressed by the deformation to be measured, a second section of the optical fiber including a further Bragg grating, the further grating being uncoupled from external mechanical loads to be measured and being subjected to temperatures identical to temperatures to which the at least one Bragg grating of the first section of the optical fiber are subjected, the second section of the optical fiber being configured for the measurement of the mechanical loads causing the deformation of the test body, in order to bring about a compensation of any thermal effects on the measurement, wherein:

the test body has an effective length ($L_{ce}$) with an elongation ($\Delta L_{ce}$) when the test body is stressed by the deformation to be measured, and the first section of the optical fiber has a length ($L_{fib}$) and a variation in length $\Delta L_{fib}$ and the measurement body has an effective length ($L_{ce}$) such that a longitudinal deformation ($\Delta L_{fib}/L_{fib}$) of the first section of the optical fiber is strictly greater than an originating deformation ($\Delta L_{ce}/L_{ce}$) of the test body, thus defining an amplification factor K that is strictly greater than 1 and is equal to $(\Delta L_{fib}/L_{fib})/(\Delta L_{ce}/L_{ce})$ in a first order.

2. Device in accordance with claim 1, wherein the length ($L_{fib}$) of the first section of the optical fiber is less than the length ($L_{ce}$) of the test body.

3. Device in accordance with claim 1, wherein the elongation ($\Delta L_{fib}$) of the first section of the optical fiber is equal to the variation in length ($\Delta L_{ce}$) of the test body.

4. Device in accordance with claim 1, wherein the at least one Bragg grating of the optical fiber comprises a plurality of Bragg gratings assigned to the measurement of the deformations of the same test body, and in that the length ($L_{fib}$) of the first section of the optical fiber is greater than a shortest distance along the optical fiber that includes the plurality of Bragg gratings.

5. Device in accordance with claim 1, wherein: the preload places the first section of the optical fiber under tension, and the deformations to be measured increase this tension.

6. Device in accordance with claim 5, wherein: the preload places the first section of the optical fiber under tension, the deformations to be measured reduce this tension, and an initial preload of the preload is sufficient for the first section of the optical fiber to remain under tension even if the section of the optical fiber is subjected to a greatest deformation of its measurement range.

7. Device in accordance with claim 1, wherein the preload places the first section of the optical fiber under compression, and the first section of the optical fiber is surrounded by an antibuckling device.

8. Device in accordance with claim 7, wherein the antibuckling device comprises at least one section of a deformable rigid cladding surrounding the first section of the optical fiber, the cladding being configured to slide along the first section of the optical fiber with a lowest possible clearance, when the at least one section includes a plurality of sections, the plurality of sections being separated from one another by cylindrical or toric pieces made of a sufficiently elastic material for allowing the first section of the optical fiber greatest compressed deformation to reach a greatest compressed deformation in its measurement range.

9. Device for measuring forces or mechanical loads comprising means for converting the forces or the mechanical loads into a uniaxial deformation measured by a device in accordance with claim 1.

10. Deformation-measuring system, comprising a plurality of optical fibers, each equipped with at least one device in accordance with claim 1, wherein the system comprises a temporal demultiplexing device for reading the signals of each of the fibers in succession, wherein these signals are then demultiplexed spectrally to obtain the characteristic wavelength of each of the Bragg gratings.

11. Device for measuring temperatures comprising means for converting temperatures of the second section of the optical fiber into a uniaxial deformation measured by a device in accordance with claim 1.

12. Device in accordance with claim 1, further comprising means for homogenizing temperatures to which the Bragg gratings to correspond to temperatures assigned to the test body.

13. Device in accordance with claim 12, wherein the means for homogenizing the temperature employ free circulation of a coolant.

14. Device in accordance with claim 1, wherein the test body has a constant cross section.

15. Device in accordance with claim 1, wherein the test body has a variable cross section.

16. Device in accordance with claim 1, wherein the test body comprises at least one projecting element, which is integral with the test body, to which the first section of the optical fiber is fixed, this projecting element being undeformable to external actions to which the test body is subjected during the test.

17. Device in accordance with claim 16, wherein the at least one projecting element includes two projecting elements and the test body, the optical fiber and the at least one projecting element confirm the equation:

$$a_{ce} \cdot L_{0ce} = a_g \cdot L_{0g} + a_f L_{0fib} + a_d \cdot L_{0d}$$

where $a_{ce}$ is a coefficient of thermal expansion of the test body and $L_{0ce}$ is a length of the test body, $a_g$ and $a_d$ are coefficients of thermal expansion of the two projecting elements, $L_{0g}$ and $L_{0d}$ are lengths of the two projecting elements, $a_f$ is a coefficient of thermal expansion of the optical fiber and $L_{0fib}$ is the mechanical preloaded length between two fixing points of the first section of the optical fiber on the two projecting elements, respectively.

18. Device in accordance with claim 16 wherein the at least one projecting element includes two projecting elements and, for any portion of the first section of the optical fiber kept preloaded between two respective fixing points on the two projecting elements, the test body, the optical fiber and the elements confirm the equation:

$$L_{0g} = L_{0d} = L_{0fib}/2 = L_{0ce}/4$$

where $L_{0ce}$ is an effective length of the test body, $L_{0g}$ and $L_{0d}$ are respective lengths of the two projecting elements, and $L_{0fib}$ is a length of the optical fiber mechanically preloaded between the two projecting elements.

19. Device in accordance with claim 1, wherein the first section of the optical fiber has a mechanically deformable cladding and first and second ends that are fixed to a fixing device comprising a chuck including at least three clamping jaws distributed around a principal axis merged with a central axis of the fiber, each clamping jaw comprising an internal surface consisting of a central portion and two end portions, the end portions being made so as to extend the central portion by progressively deviating from the principal axis of the device, and each comprising at least one part in contact with the mechanically deformable cladding of the fiber when the clamping jaw occupies a clamping position.

20. Device in accordance with claim 19, wherein a diameter left free by the clamped jaws is at most slightly greater than the diameter of the single core of the fiber.

21. Device in accordance with claim 1, wherein the test body is integral with, or incorporated in, a pantograph.

22. Device for measuring forces or mechanical loads in accordance with claim 9, wherein a product of a modulus of elasticity of a material constituting the test body and a shortest section subjected to deformation is as low as possible, without enabling the test body to be deformed at any point in a plastic manner.

23. Device for measuring temperatures in accordance with claim 11, according to which a coefficient of thermal expansion of the test body, $a_{ce}$, is greater than a coefficient of thermal expansion, $a_f$, of the optical fiber and greater than respective coefficients of thermal expansion, $a_g$ and $a_d$, of the two projecting elements to which the optical fiber is fixed.

24. System in accordance with claim 22, wherein the system measures a result of external mechanical interactions acting on a pantograph.

* * * * *